United States Patent
Shigeki et al.

(10) Patent No.: US 7,110,120 B2
(45) Date of Patent: Sep. 19, 2006

(54) MOVEMENT-DIRECTION DETERMINATION APPARATUS

(75) Inventors: Kato Shigeki, Ohta-ku (JP); Hidejiro Kadowaki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 10/752,635

(22) Filed: Jan. 6, 2004

(65) Prior Publication Data

US 2004/0145749 A1    Jul. 29, 2004

(30) Foreign Application Priority Data

Jan. 24, 2003  (JP) ............................. 2003-015585
Jan. 24, 2003  (JP) ............................. 2003-015586
Jun. 26, 2003  (JP) ............................. 2003-182054

(51) Int. Cl.
    *G01B 9/02*     (2006.01)

(52) U.S. Cl. ....................... 356/493; 356/512; 356/498

(58) Field of Classification Search ........ 356/491–493, 356/498, 511, 512, 495, 499, 27, 28, 615, 356/619, 487, 488, 494
See application file for complete search history.

(56) References Cited

U.S. PATENT DOCUMENTS

| 3,820,896 | A | 6/1974 | Stavis | |
| 6,246,482 | B1* | 6/2001 | Kinrot et al. | 356/499 |
| 6,914,682 | B1* | 7/2005 | Kato | 356/493 |
| 2005/0094154 | A1* | 5/2005 | Baney et al. | 356/499 |

* cited by examiner

*Primary Examiner*—Hwa (Andrew) Lee
(74) *Attorney, Agent, or Firm*—Canon U.S.A., Inc.; Intellectual Property Division (57) ABSTRACT

A laser beam is irradiated onto a moving object, and scattered light reflected from the moving object is split into two beams, which are then received through respective spatial filters that are 90° out of phase with each other, thereby providing two signals. The signals are processed to determine the movement direction of the moving object.

10 Claims, 12 Drawing Sheets

MOVEMENT DIRECTION X

MOVEMENT-DIRECTION DETERMINATION APPARATUS

BACKGROUND OF THE INVENTION

1. Field of the Invention

The present invention relates to a movement direction determination apparatus for non-contact determination of the movement direction of an object.

2. Description of the Related Art

Figure 10:
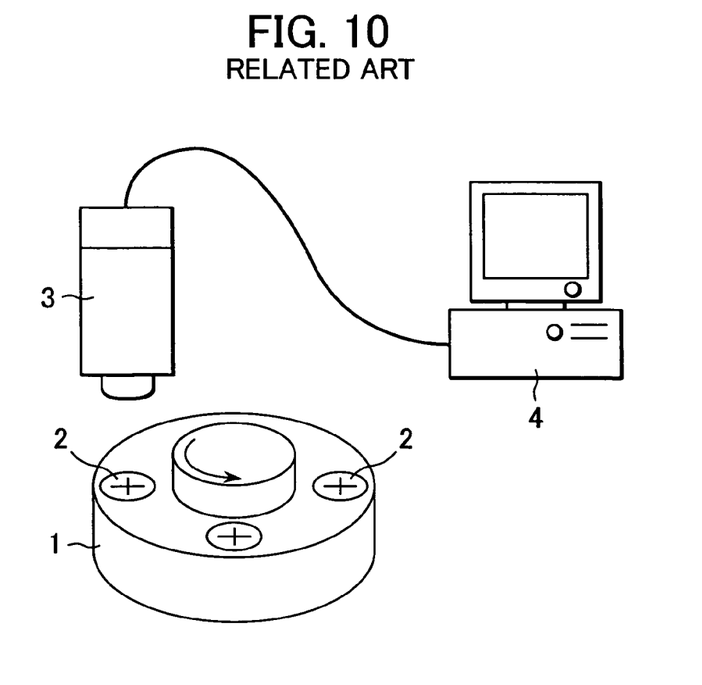
FIG. 10 is a schematic view of a movement-direction determination apparatus according to a known method.
Figure 11A:
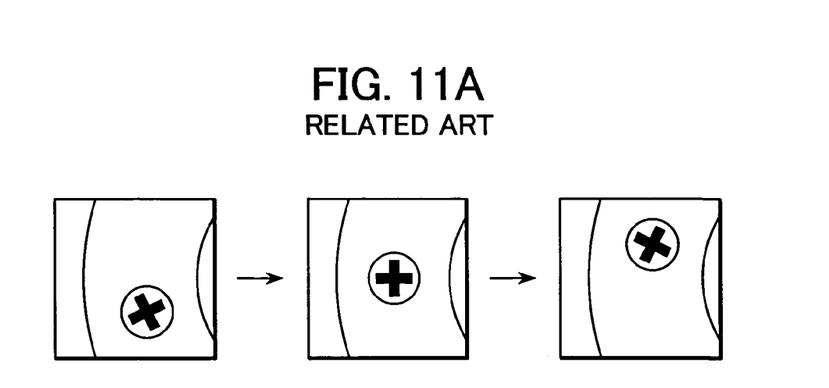
FIGS. 11A and 11B are schematic views for illustrating image processing for determining a movement direction according to a known method.
Figure 11B:
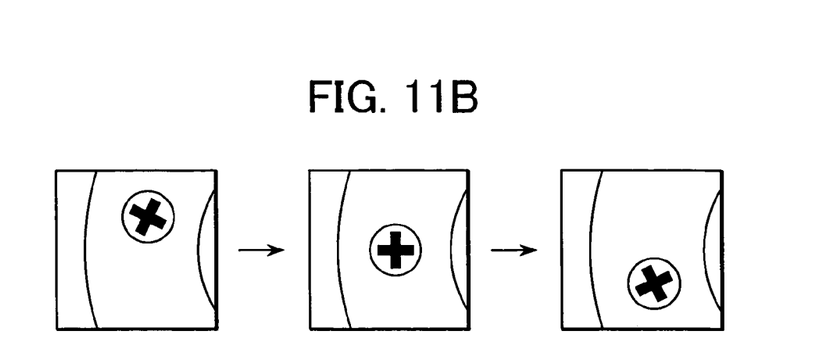

FIG. 10 is a schematic view of a rotation-direction determination apparatus for use in assembly inspection for spindle motors and the like. A rotary spindle motor 1 is assembled with geometric structures, such as screws 2. A CCD (charge coupled device) camera 3 captures images of a position at which the screws 2 pass during the rotation of the spindle motor 1 and transfers the images to a personal computer 4. The personal computer 4 then analyzes the images at a sufficiently high sampling frequency relative to the rotation frequency of the spindle motor 1. As a result, images as shown in FIG. 11A are obtained for clockwise rotation, while images shown in FIG. 11B are obtained for counterclockwise rotation.

Based on such a series of images, a determination can be made as to in which direction the images of the screws 2 move. In general, this direction determination is made through analysis with software installed on the personal computer 4, and the result is then displayed.

In the above example of the related art, geometric structures, such as the screws 2, need to exist on rotating objects or moving objects in order to determine the movement directions.

When, however, the current trends toward higher productivity and lower cost are considered, it is problematic to use the screws 2 and the like for the assembly. Thus, it is considered that press fitting or the like, which is a less expensive assembly technique, will be adopted in the future. In such a case, geometric structures cannot be expected to exist on rotating objects, such as the spindle motor 1, thus making it difficult to determine the movement of the shape captured in images.

SUMMARY OF THE INVENTION

To overcome the foregoing problem, an object of the present invention is to provide a movement direction determination apparatus that is capable of performing non-contact determination of the movement direction of an object, such as a metal plate or milled workpiece, without any geometric structure.

To achieve the above object, the present invention provides a movement-direction determination apparatus that includes a coherent light source, a light-splitting section, a spatial filter detector, and a signal processing circuit. The coherent light source shines a light beam onto a moving object having a light scattering surface. The light-splitting section splits scattered light reflected from the light scattering surface into a plurality of beams. The spatial filter detector detects the split beams at a phase difference of approximately 90° and outputs two frequency signals, which provide phase difference information, during movement of the moving object. The signal processing circuit determines a movement direction of the moving object in accordance with the phase difference information.

The movement-direction determination apparatus further includes high-pass filters or band-pass filters, comparators, a phase determination circuit, and an averaging circuit. The filters eliminate low-frequency components of the frequency signals, the comparators binarizes signals output from the filters, and the phase determination circuit determines an advance or delay of the phases of binary signals output from the comparators and generates pulses. The averaging circuit time-averages the pulses output from the phase determination circuit. The movement direction of the moving object is determined in accordance with an output from the averaging circuit.

As described above, the movement-direction determination apparatus according to the present invention can perform non-contact determination of the movement direction of an object having a machined surface of a metal plate, grinded metal, or the like.

Further objects, features and advantages of the present invention will become apparent from the following description of the preferred embodiments with reference to the attached drawings.

DESCRIPTION OF THE PREFERRED EMBODIMENTS

The present invention will be described in detail in accordance with embodiments thereof shown in FIGS. 1 to 14.

Figure 1:
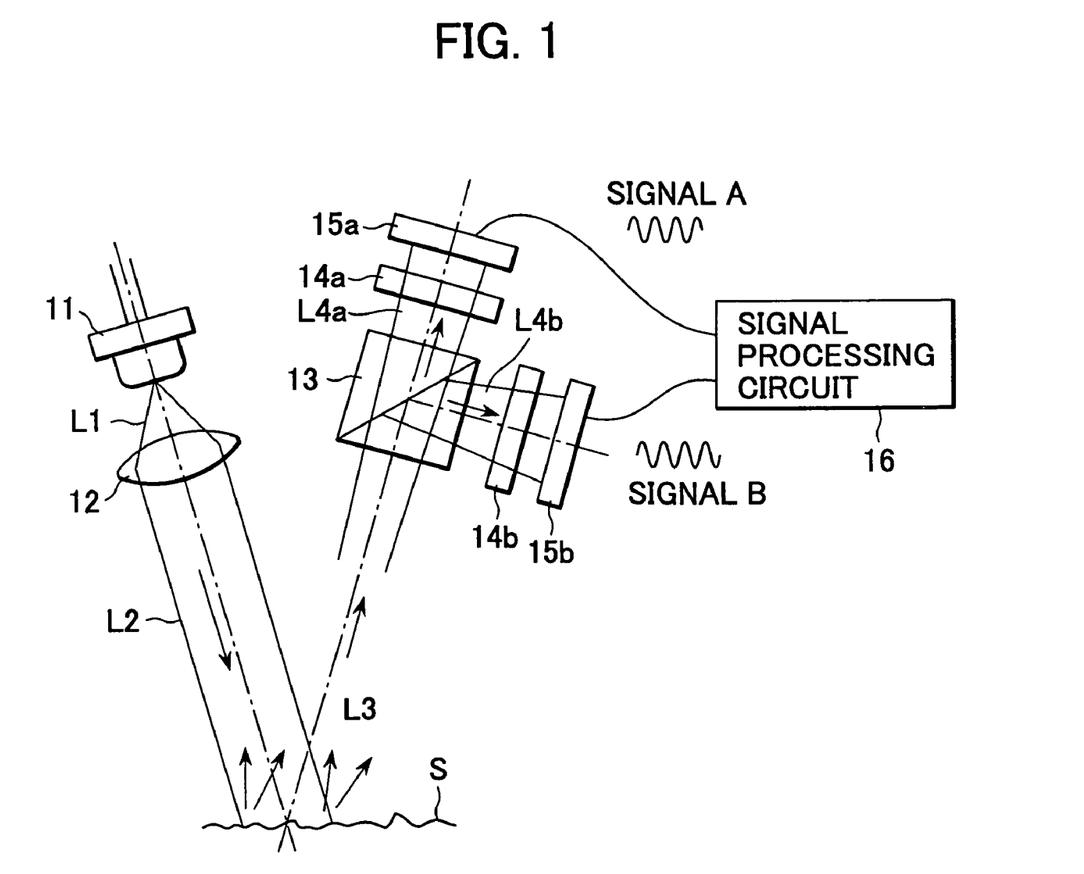
FIG. 1 is a schematic diagram of a first embodiment.

FIG. 1 is a schematic diagram of a first embodiment of the present invention. A coherent light source 11 for emitting coherent laser light and a collimator lens 12 are arranged in the incident direction above a moving object S to be measured. A beam splitter 13, a slit grating 14a, and a light-receiving element 15a are sequentially arranged in the reflection direction above the moving object S. A slit grating 14b and a light-receiving element 15b are further arranged in the reflection direction of the beam splitter 13. Outputs from the light-receiving elements 15a and 15b are supplied to a signal processing circuit 16.

In this case, the moving object S has a so-called "optical scattering surface" that is sufficiently coarse relative to the oscillation wavelength of the coherent light source 11. A laser beam L1 emitted from the coherent light source 11 is converted by the collimator lens 12 into a substantially parallel beam L2, which is then irradiated onto the moving object S. The beam L2 is reflected by the moving object S to form scattered light L3, some of which enters the beam splitter 13 and is split by the light-splitting surface of the beam splitter 13 into scattered light L4a and L4b.

The scattered light L4a, which has passed through the light-splitting surface of the beam splitter 13, passes through the slit grating 14a, which serves as a spatial filter, and enters the light-receiving element 15a. On the other hand, the scattered light L4b, which has been reflected by the light-splitting surface of the beam splitter 13, passes through the slit grating 14b and enters the light-receiving element 15b.

Figure 2A:
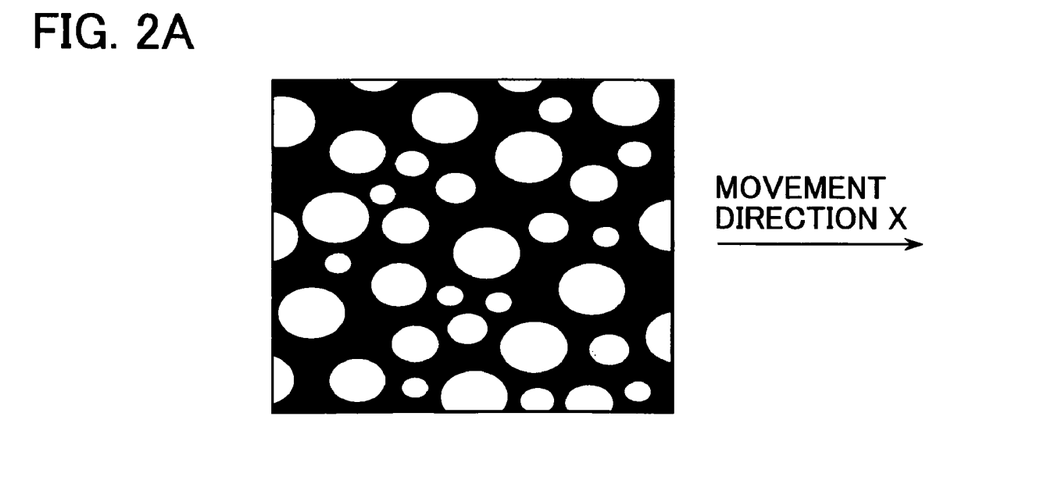
FIG. 2A illustrates the movement of speckle patterns and FIG. 2B illustrates spatial filters.

In this case, since the beam L1, which is composed of coherent light, is irradiated onto the optical scattering surface of the moving object S, speckle patterns P as shown in FIG. 2A are produced on the light-receiving elements 15a and 15b. The speckle patterns P have a property of moving in the same direction as the movement direction X of the moving object S. Since the scattered light L3 reflected by the moving object S is split by the beam splitter 13, the speckle patterns P produced on the light-receiving elements 15a and 15b have the same pattern at the same distance from the light-splitting surface and also have the same movement.

The scattered light L4a and L4b, which is split by the beam splitter 13, pass through the corresponding slit gratings 14a and 14b, which have comb teeth. Each of the slit gratings 14a and 14b has a cycle defined by the pitch p of the comb teeth and serves as a spatial filter. Beams received by the light-receiving elements 15a and 15b are converted into AC (alternating current) signals A and B, each having a frequency of V/p, where V indicates the movement speed of the speckle patterns P.

Figure 2B:
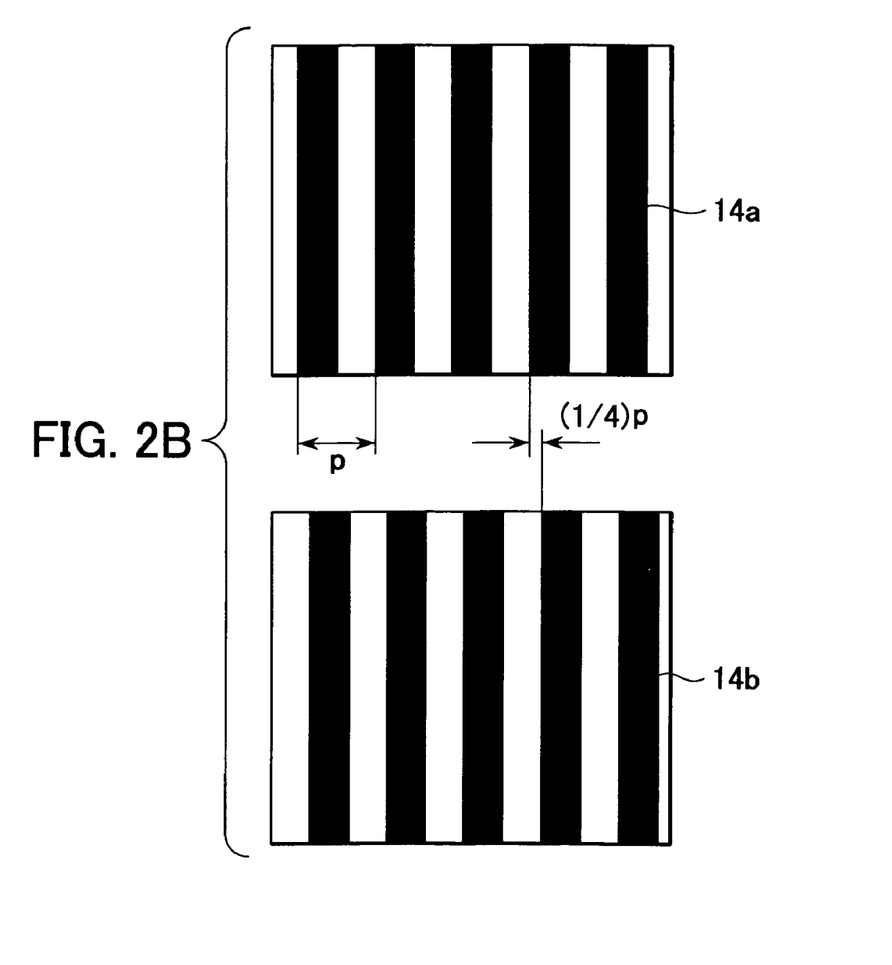
Figure 3:
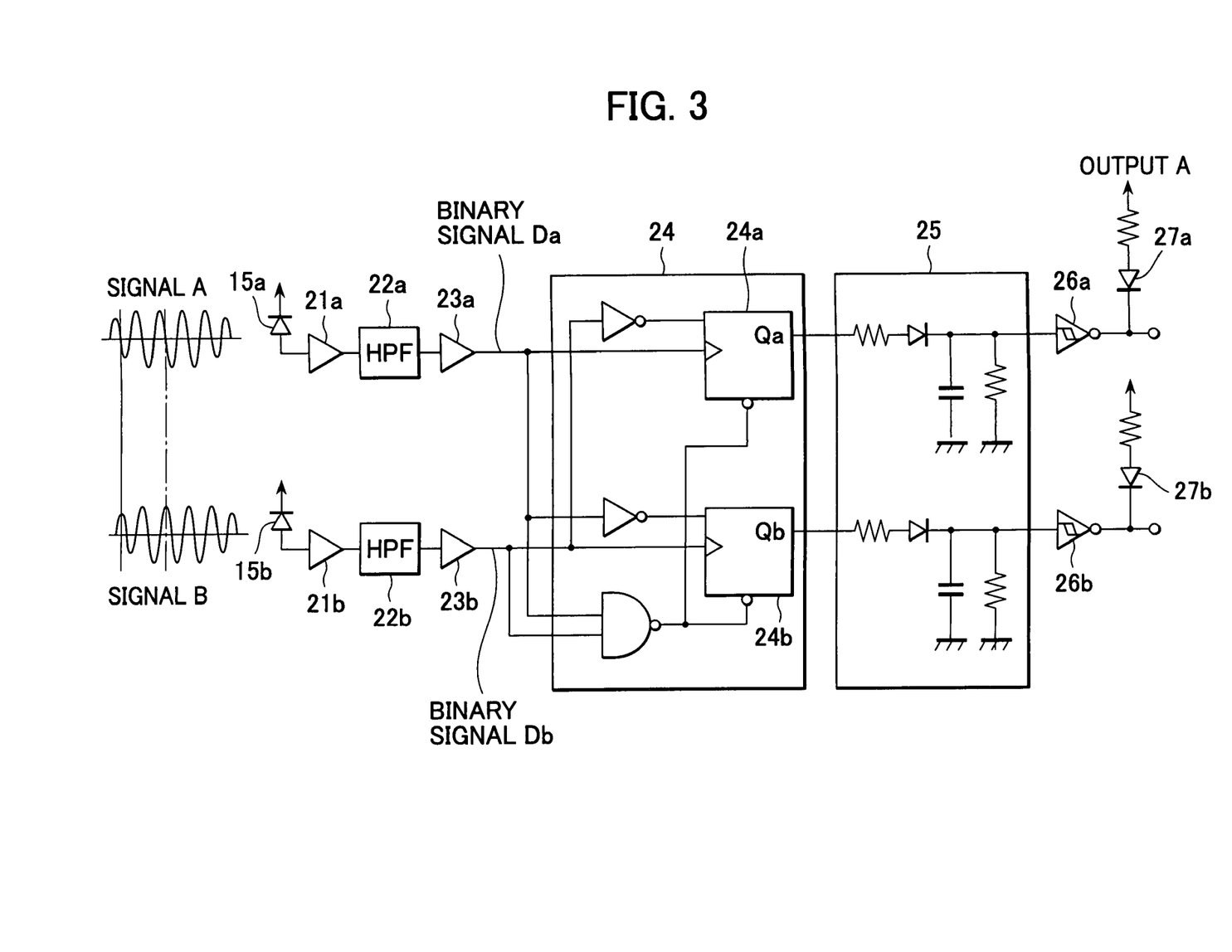
FIG. 3 is a diagram of a first processing circuit.

As shown in FIG. 2B, when the slit gratings 14a and 14b are spatially displaced from each other by (¼)p in the movement direction of the speckle patterns P, photoelectric signals output from the light-receiving elements 15a and 15b become AC signals A and B that are a ¼ cycle out of phase with each other, as represented by signals A and B shown in FIG. 3. In this case, setting the pitch p of the slit gratings 14a and 14b to approximately twice the average diameter of the speckle patterns P allows frequency signals to be efficiently obtained.

FIG. 3 is a circuit block diagram of a first processing circuit. Specifically, the first processing circuit corresponds to the signal processing circuit 16 and determines the direction of the phase shift in real time. The light-receiving elements 15a and 15b are constituted by silicon photodiodes and preamplifiers 21a and 21b convert the photoelectric signals into respective voltage signals. The voltage signals (unprocessed signals) include not only AC signals having a frequency of V/p but also DC voltages (offset voltages) and voltages changed due to irregular light reflection by the moving object S. Thus, DC components and low-frequency components are eliminated by high-pass filters 22a and 22b from the voltages signals.

Subsequently, the resulting signals are converted into binary signals Da and Db by corresponding comparators 23a and 23b. Using the binary signals Da and Db, a phase-direction determination circuit 24 determines which of the phases of the binary signals Da and Db is approximately 90° ahead or behind.

Figure 4:
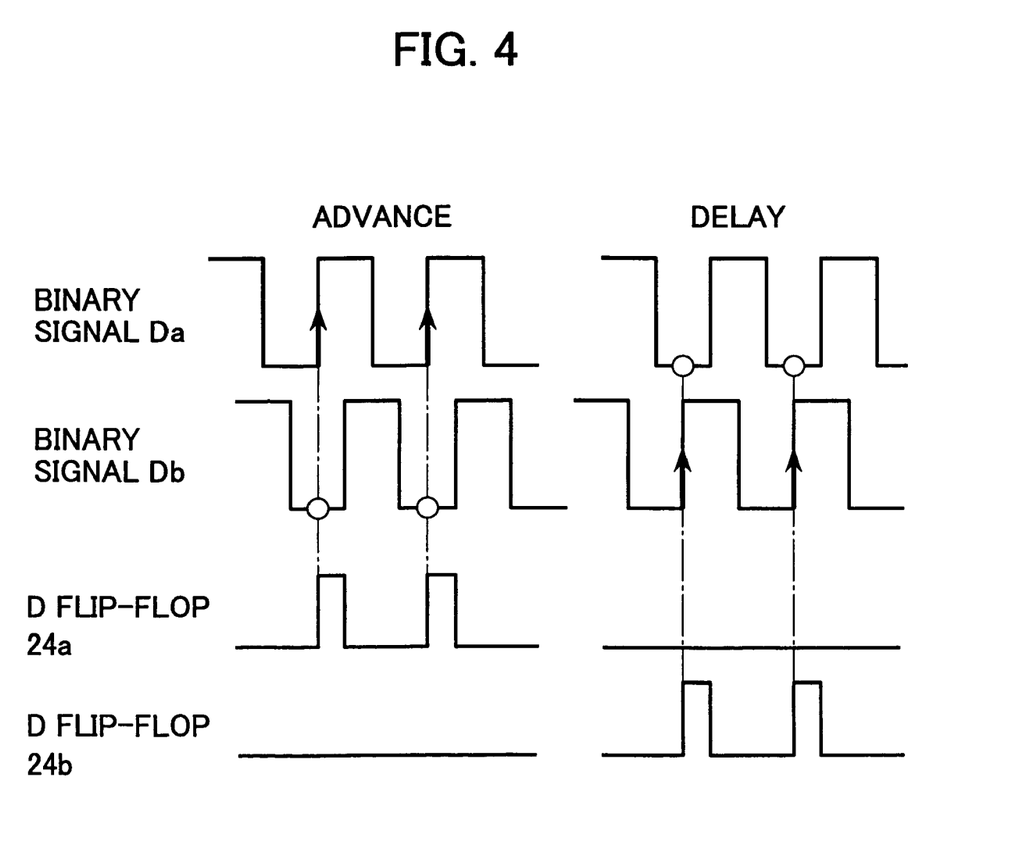
FIG. 4 illustrates signal processing of the processing circuit.

Specifically, D flip-flops 24a and 24b are reset by a NAND operation of the two binary signals Da and Db, and then, as shown in signal waveforms in FIG. 4, one of the D flip-flops whose binary signal Da or Db rises earlier than the other is set (activated), which allows determination of the direction of the phase shift. For example, when the phase of the binary signal Da is ahead of the phase of the binary signal Db, the D flip-flop 24a is set and is then reset by a NAND operation of the next two binary signals Da and Db, thereby producing a pulse signal.

The binary signals Da and Db have been described above as having ideal continuous waveforms. In practice, however, low frequency components are removed by the high-pass filter 22a from the signal A, which has DC components, and the output of the high-pass filter 22a therefore becomes like the waveform sample shown in FIG. 5. Thus, the amplitudes of the binary signals Da and Db can become substantially zero or the waveforms thereof can be deformed.

Figure 5:
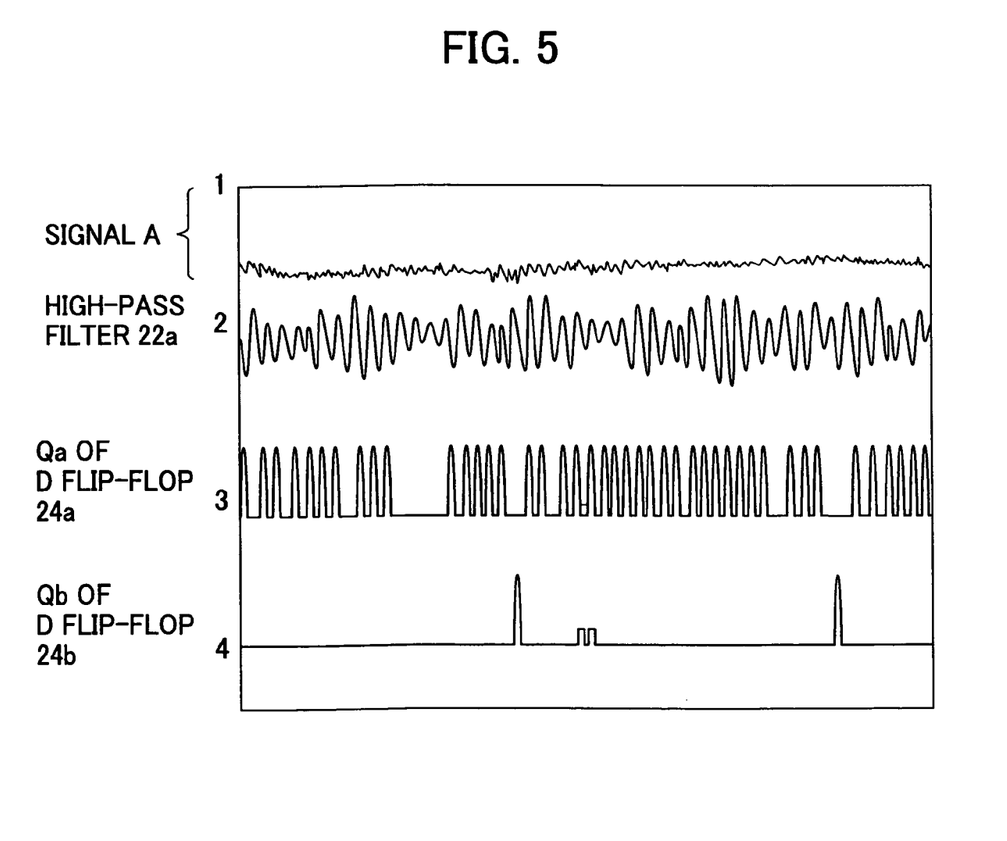
FIG. 5 illustrates waveforms of signals.

This is possibly because that, as the speckle patterns move in response to the movement of the moving object S, the shapes of the speckle patterns also change. Consequently, the phases are sometimes incorrectly detected. In the case of this example, the D flip-flop 24a produces an output Qa containing pulse components, and the D flip-flop 24b produces an output Qb containing a few percent of pulses of the output.

An integration circuit 25 includes resistors, capacitors, and diodes for the respective signals A and B. When the phase of the signal A is ahead as in the above example, the number of pulses output from the D flip-flop 24a is larger, thus causing the integrated voltage to increase so that an input to a Schmidt inverter 26a exceeds a threshold level to turn on an LED 27a, causing an output A to go low. On the other hand, in this case, the number of pulses output from the D flip-flop 24b is smaller, thus keeping the integrated voltage at a low level, so that an output from a Schmidt inverter 26b is maintained at a high level.

Although the simple signal processing circuit 16 has been described as one example with reference to FIG. 3, the bands of the high-pass filters 22a and 22b (or band-pass filters) need to be changed in order to measure a moving object S that moves at a significantly different speed. Thus, it is preferable to configure the high-pass filters 22a and 22b (or band-pass filters) such that the pass-bands thereof can be manually changed or can be automatically changed by tracking the frequencies. Instead of the above-described circuit, another circuit configuration may be used. For example, the signals A and B may be subjected to analog-to-digital conversion and the resulting signals may be supplied to a CPU to perform a computational operation, such as cross correlation so as to determine that the phase is advanced or delayed.

The requirement for the surface of the moving object S to obtain the above-noted frequency signals is that speckle patterns be produced on the light-receiving elements 15a and 15b, i.e., the surface of the moving object S must be a light-scattering surface of a metal plate of a grinded metal. Thus, there is no need to have any geometric structure, such as a screw, on the moving object S. This makes it possible to obtain a signal using a machined surface. Not all machined surfaces will work. For example, a mirrored surface does not produce speckle patterns. Even if no structures such as screws are provided on the surface, because of improved manufacturing efficiency of spindle motors or the like in the future which includes cost reduction, the rotation directions of the spindle motors can be determined in a non-contact manner.

Figure 6:
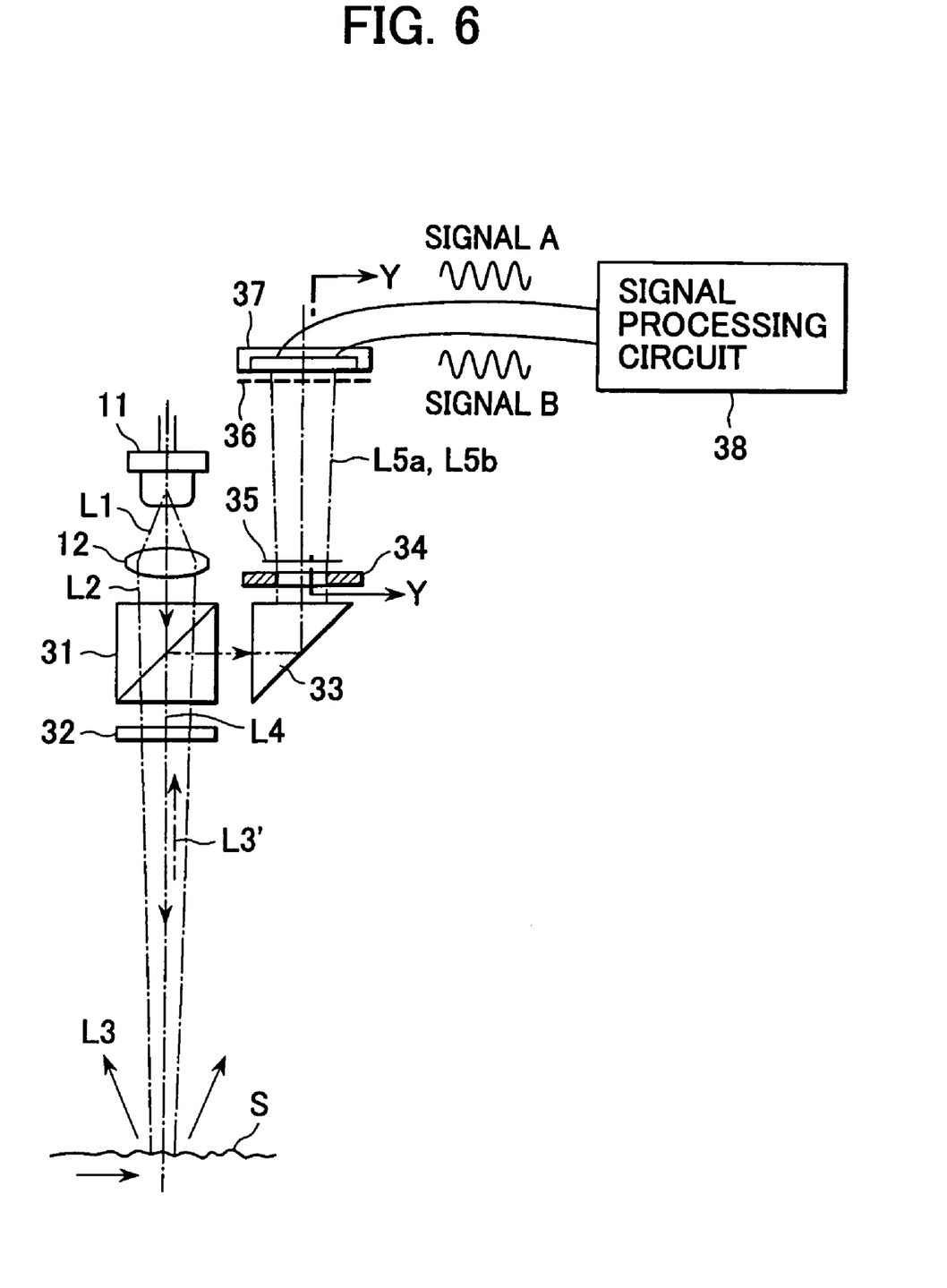
FIG. 6 is a schematic diagram of a second embodiment.

FIG. 6 is a schematic diagram of a second embodiment, in which the same reference numerals as those in the first embodiment denote the same elements and members. In the second embodiment, a beam L2 that is irradiated onto the moving object S via the collimator lens 12 is converted into a substantially-converging beam, and a polarization beam splitter 31 and a λ/4 wave plate 32 are arranged between the collimator lens 12 and the moving object S.

Of scattered light L3 reflected from the moving object S, light that returns to the polarization beam splitter 31 through the λ/4 wave plate 32 is reflected to the side by the polarization beam splitter 31, and in the reflection direction, a prism mirror 33, an aperture 34, a grating beam splitter 35, a slit plate 36, and a light-receiving element 37 are sequentially arranged.

Figure 7:
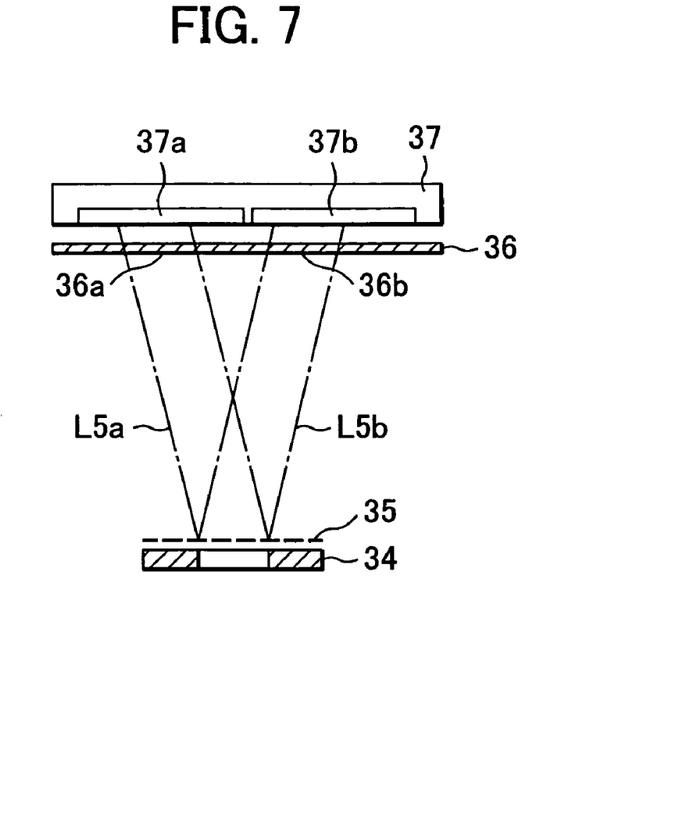
FIG. 7 is a sectional view along the line Y—Y shown in FIG. 6.
Figure 8:
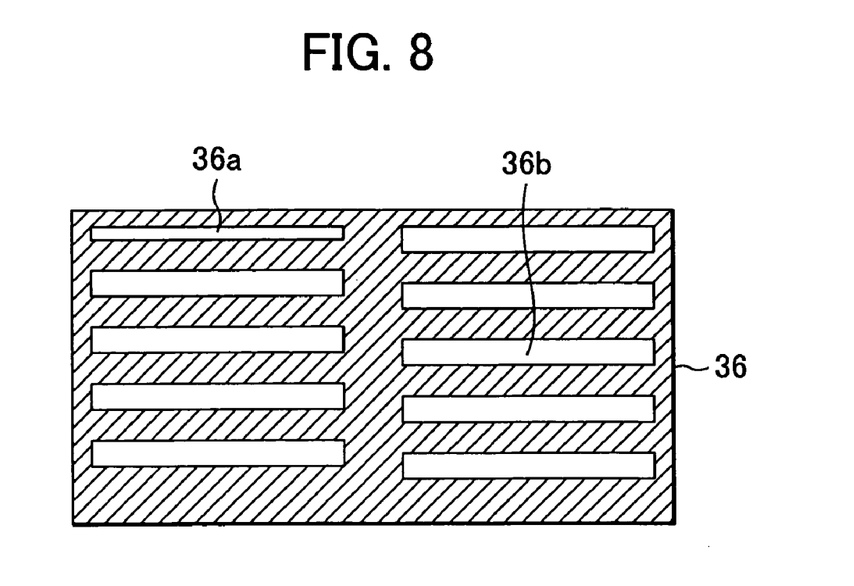
FIG. 8 is a plan view of a slit plate.

As shown in the sectional view in FIG. 7, which is taken along the line Y—Y in FIG. 6, the slit plate 36 has two gratings 36a and 36b and the light-receiving element 37 has two elements 37a and 37b. Outputs from the elements 37a and 37b are supplied to a signal processing circuit 38. As shown in FIG. 8, in the slit plate 36, the gratings 36a and 36b are arranged in the form of a single plate such that they are displaced from each other by ¼ cycle with respect to the movement of the speckle patterns.

Outputs from the elements 37a and 37b are supplied to the signal processing circuit 38 as signals A and B.

A beam L1 emitted by the coherent light source 11 is slightly converged by the collimator lens 12 into the beam L2, which is then irradiated onto the moving object S through the polarization beam splitter 31 and the λ/4 wave plate 32. The polarization beam splitter 31 is arranged so as to transmit light in the polarization direction of the beam L1 and to reflect light in a polarization direction perpendicular thereto. The λ/4 wave plate 32 has a crystal axis that is arranged at an angle of 45° relative to the polarization direction of the beam L1, so as to convert the linearly-polarized beam L1 into circularly-polarized light and also to convert circularly-polarized light of the scattered light L3 (described below) reflected from the moving object S into a linearly-polarized beam that is perpendicular to the linearly-polarized beam of the beam L1.

The moving object S has a so-called "optical scattering surface" that is sufficiently coarse relative to the oscillation wavelength of the light source 11, and a beam irradiated onto the moving object S becomes the scattered light L3. Partial light L3' of the scattered light L3 heads to the λ/4 wave plate 32 and is converted into linearly-polarized light L4, which is perpendicular to the polarization direction of the beam L1, as described above. The linearly-polarized light L4 is then reflected by the polarization beam splitter 31 and is further reflected upward by the prism mirror 33. The light L4 reflected by the prism mirror 33 is transmitted through the aperture 34. The resulting beam is split by the grating beam splitter 35 into ±1st order light, which becomes scattered light L5a and L5b. Thereafter, the scattered light L5a and L5b passes through the common slit plate 36. In this case, the phases of the scattered light L5a and L5b can be displaced from each other by the slit plate 36 present in the optical path. The resulting scattered light L5a and L5b is detected by the respective elements 37a and 37b, so that the AC signals A and B that are a ¼ cycle out of phase with each other can be obtained as in the first embodiment.

In the second embodiment, since the incident beam L2 is converted into the substantially-converging beam, a larger amount of light is reflected back from the moving object S directly opposite to the incident direction. Thus, as compared to a case in which a parallel beam is irradiated onto the moving object S, the amount of light received by the light-receiving element 37 increases, so that signals having improved signal-to-noise (S/N) ratios can be obtained. With this configuration, the second embodiment provides the same advantage as the first embodiment and also allows for miniaturized component arrangement.

Figure 12:
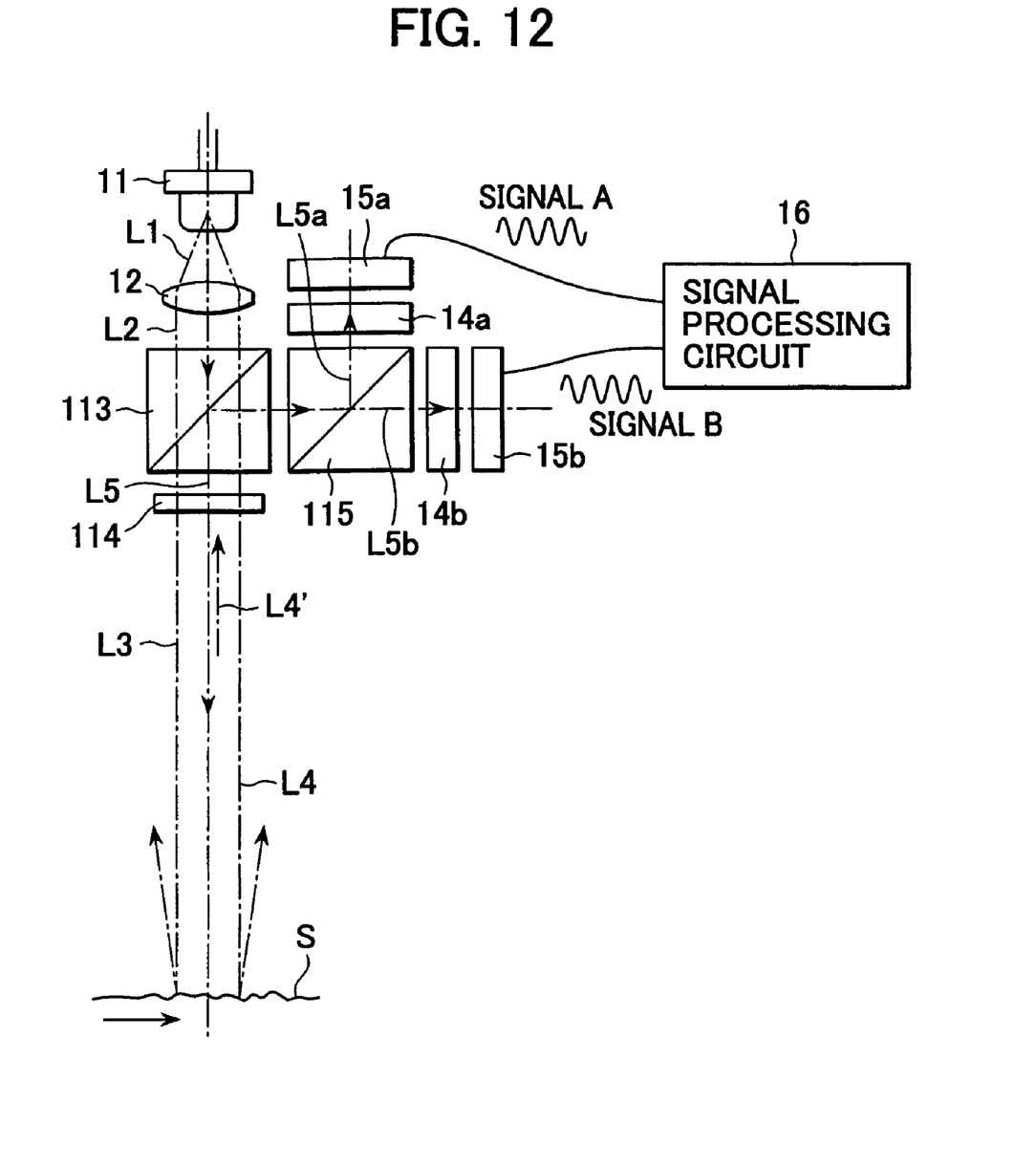
FIG. 12 is a schematic diagram of a third embodiment.

FIG. 12 is a schematic diagram of a third embodiment. The coherent light source 11 is constituted by a laser diode or the like and emits linearly-polarized light. This linearly-polarized light reaches the moving object S through the collimator lens 12, a polarization beam splitter 113, and a λ/4 wave plate 114, which are arranged in the light-emitting direction of the coherent light source 11. In the direction in which the beam from the moving object S is reflected by the polarization beam splitter 113, a beam splitter 115, the slit grating 14a, and the light-receiving element 15a are arranged. In the direction in which the beam is transmitted through the beam splitter 115, the slit grating 14b and the light-receiving element 15b are arranged. Outputs from the light-receiving elements 15a and 15b are supplied to the signal processing circuit 16.

A beam L1 emitted by the coherent light source 11 is converted into a substantially parallel beam L2 by the collimator lens 12. The substantially parallel beam L2 then enters the polarization beam splitter 113 and is irradiated onto the moving object S through the λ/4 wave plate 114. In this case, the polarization beam splitter 113 transmits light in the polarization direction of the beam L2 emitted by the coherent light source 11 and does not transmit light in the polarization direction perpendicular thereto. The λ/4 wave plate 114 has a crystal axis that is arranged at an angle of 45° relative to the polarization direction of the beam L2, so as to convert the linearly-polarized beam L2 into a circularly-polarized beam L3. In addition, the λ/4 wave plate 114 converts a circularly-polarized beam L4' of scattered light L4, reflected from the polarization-maintaining scattering surface of the metal or the like of the moving object S, into linearly-polarized light L5 that is perpendicular to the linearly-polarized light of the beam L2.

The moving object S has a so-called "optical scattering surface" that is sufficiently coarse relative to the oscillation wavelength of the coherent light source 11, so that the beam L3 becomes the scattered light L4 after being irradiated onto the moving object S. The circularly-polarized light L4', which is part of the scattered light L4, is returned toward the λ/4 wave plate 114 along the same optical path as that in the light-incident direction, and is converted into the linearly-polarized light L5, as described above. The linearly-polarized light L5 is reflected by the polarization beam splitter 113 toward the beam splitter 115 and is then split by the light-splitting surface thereof into scattered light L5a and L5b.

The scattered light L5a passes through the slit grating 14a, which serves as a spatial filter, and enters the light-receiving element 15a. Similarly, the scattered light L5b passes through the slit grating 14b and enters the light-receiving element 15b. Since coherent light is irradiated onto the light scattering surface of the moving object S, speckle patterns P as shown in FIG. 2A are produced on the light-receiving elements 15a and 15b.

The speckle patterns P have a property of moving in the same direction as the movement direction X of the moving object S. Since the beam splitter 115 splits the scattered light L4 reflected from the moving object S, the speckle patterns P produced on the light-receiving elements 15a and 15b have the same pattern at the same distance from the light-splitting surface and also have the same movement.

The scattered light that has been split by the beam splitter 115 passes through the corresponding slit gratings 14a and 14b, each of which has a cycle defined by a pitch p and serves as a spatial filter. Beams received by the light-receiving elements 15a and 15b are converted into AC signals A and B, each having a frequency of V/p, where V indicates the movement speed of the speckle patterns P.

As shown in FIG. 2B, the slit gratings 14a and 14b are spatially displaced from each other by (¼)p in the movement direction of the speckle patterns P, so that photoelectric signals that are output from the light-receiving elements 15a and 15b become AC signals A and B that are a ¼ cycle out of phase with each other. Further, setting the pitch p of the slit gratings 14a and 14b to approximately twice the average diameter of the speckle patterns P allows frequency signals to be efficiently obtained.

Figure 13:
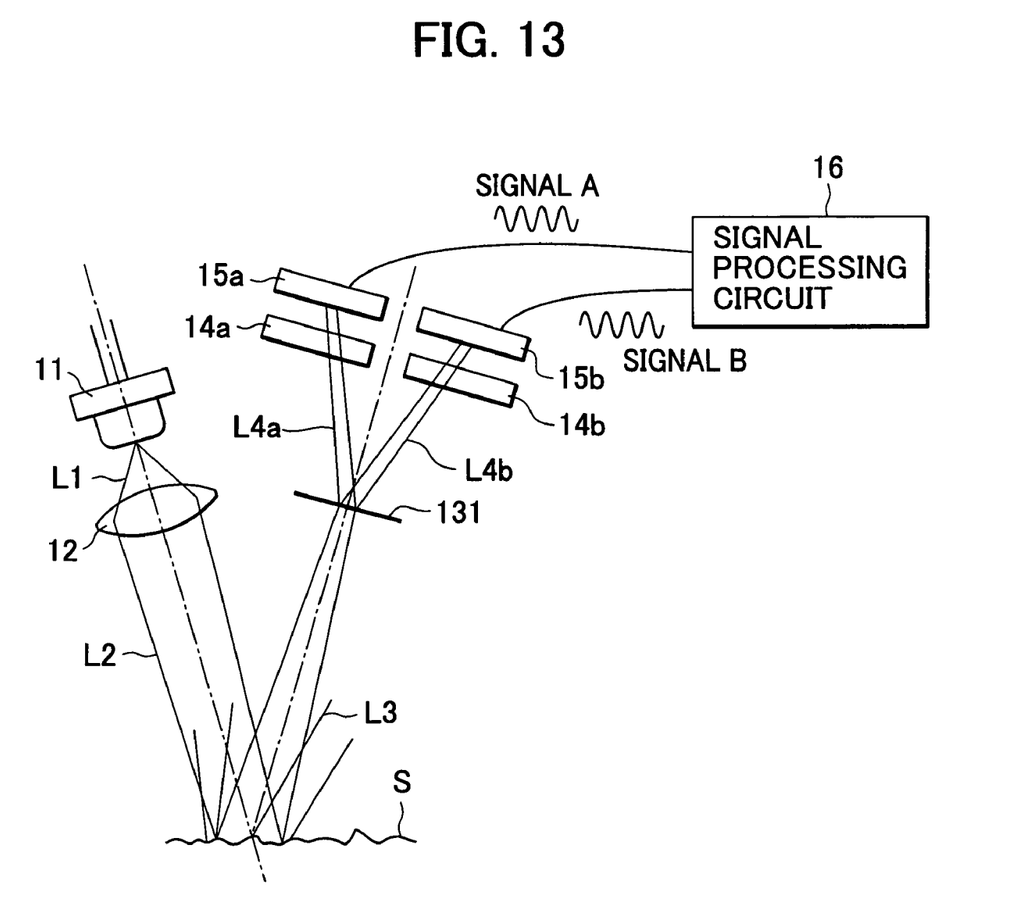
FIG. 13 is a schematic diagram of a fourth embodiment.

FIG. 13 is a schematic diagram of a fourth embodiment. This embodiment is substantially the same, including the signal processing, as the first embodiment, except for the following points. That is, a beam L2 that is incident onto the moving object S from the collimator lens 12 is converted into a substantially-converging beam, the beam splitter 13 is replaced with a grating beam splitter 131 in the reflection direction of the moving object S, and the slit gratings 14a and 14b and the light-receiving elements 15a and 15b are arranged in parallel.

Scattered light L3 reflected from the moving object S is split by the grating beam splitter 131 into ±1st order light, which becomes scattered light L4a and L4b. As in the first embodiment, the scattered light L4a and L4b then enter the slit gratings 14a and 14b, each serving as a spatial filter, and the resulting light enters the corresponding light-receiving elements 15a and 15b.

The slit gratings 14a and 14b are arranged such that the phases thereof are spatially shifted by (¼)p relative to the optical axes, in the same manner as the first embodiment, so that AC signals A and B that are a ¼ cycle out of phase with each other are generated by the light-receiving elements 15a and 15b.

With this arrangement, the fourth embodiment can provide the same advantage as the first embodiment, but with further miniaturized components. Further, in the fourth embodiment, since the emitted beam L2 is converged into a substantially-converging beam, a larger amount of light is reflected back from the moving object S directly opposite to the incident direction. Thus, as compared to a case in which a parallel beam is irradiated onto the moving object S, the amount of light received by the light-receiving elements 15a and 15b increases. Thus, the fourth embodiment can provide signals having improved S/N ratios.

Figure 14:
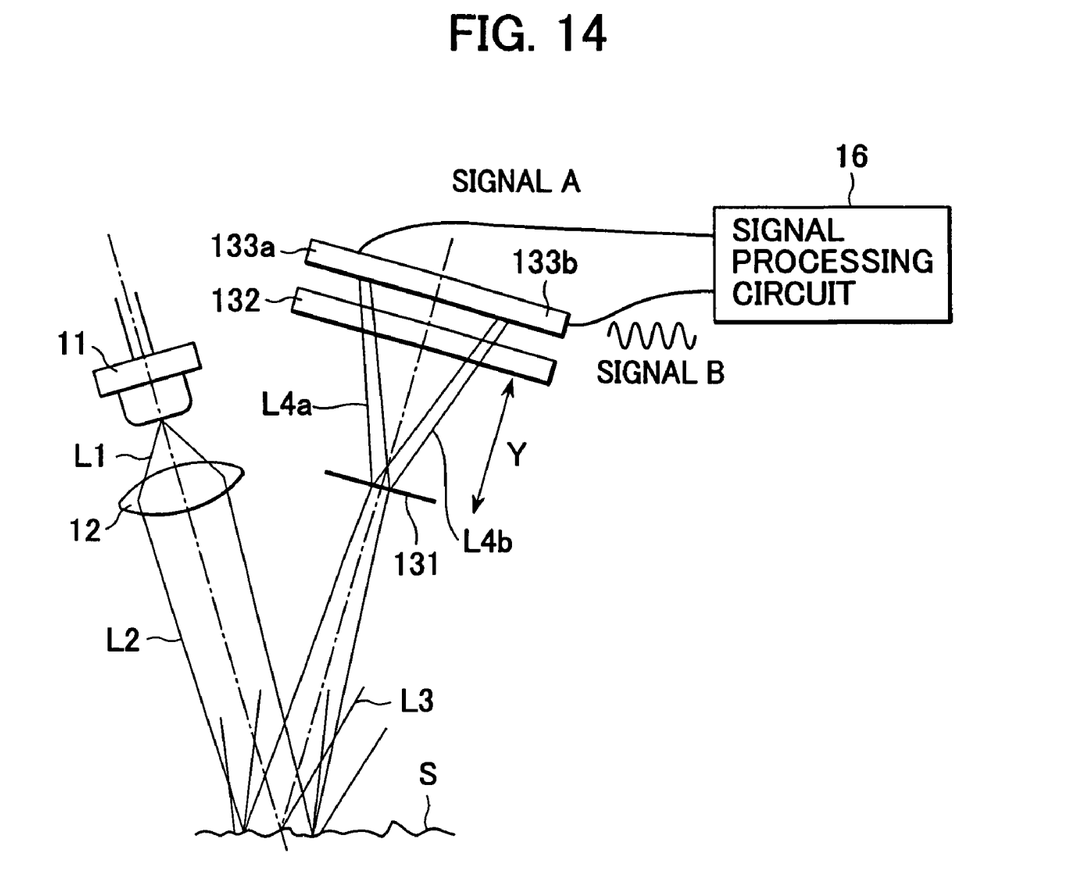
FIG. 14 is a schematic diagram of a fifth embodiment.

FIG. 14 is a schematic diagram of a fifth embodiment. The fifth embodiment is different from the fourth embodiment in the configurations of the slit gratings 14a and 14b and the light-receiving elements 15a and 15b. That is, the two slit gratings 14a and 14b are replaced with one slit plate 132 and the light-receiving elements 15a and 15b are replaced with bisected optical sensors 133a and 133b. Further, the distance between the grating beam splitter 131 and the slit plate 132 can be adjusted.

Scattered light L3 reflected from the moving object S is split by the grating beam splitter 131 into ±1st order light, which becomes scattered light L4a and L4b. The scattered light L4a and L4b then pass through the common slit plate 132. In this case, adjusting the distance of the slit plate 132 relative to the grating beam splitter 131 in the optical axis direction Y can shift the phase of the slit plate 132 present in the optical path, so that the phases of the scattered light L4a and L4b passing through the slit plate 132 can be displaced from each other. Then, detection of the resulting scattered light L4a and L4b with the respective bisected optical sensors 133a and 133b can obtain AC signals A and B that are a ¼ cycle out of phase with each other, as in the first embodiment.

The fifth embodiment can provide a smaller configuration with fewer components than the first embodiment.

Figure 9:
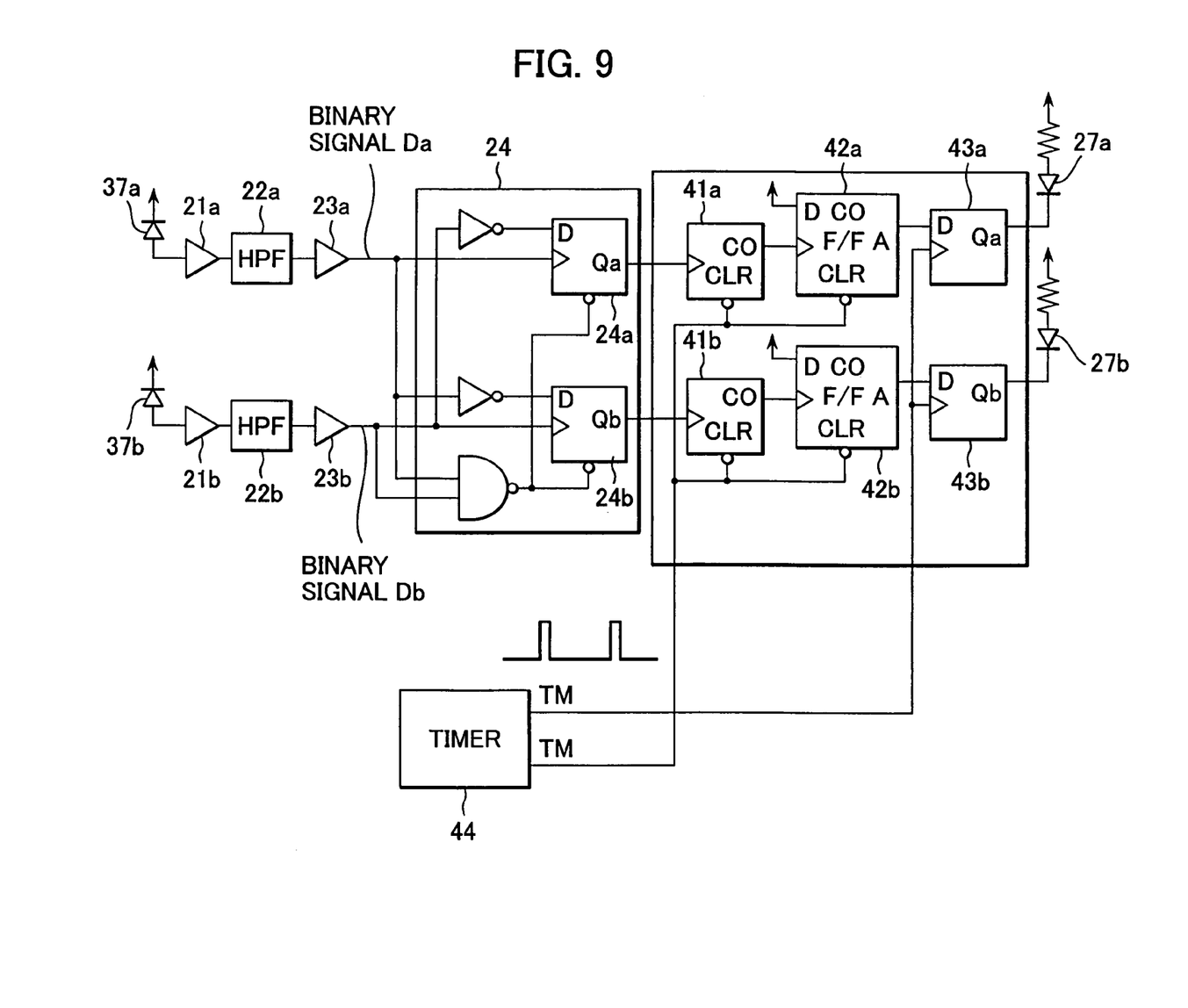
FIG. 9 is a diagram of a second processing circuit.

FIG. 9 is a schematic diagram of a second processing circuit. Specifically, FIG. 9 illustrates an example in which a direction determination circuit in the processing circuit 38 is digitized, and the same reference numerals as those in FIG. 3 denote the same circuits and elements. Pulse outputs Qa and Qb of the D flip-flops 24a and 24b in the phase determination circuit 24 are connected to counters 41a and 41b, respectively. Outputs from the counters 41a and 41b are connected to the LEDs 27a and 27b through corresponding flip-flops 42a and 42b and flip-flops 43a and 43b. Outputs from a timer 44 are connected to the counters 41a and 41b, the flip-flops 42a and 42b, and the flip-flops 43a and 43b.

Specifically, the counters 41a and 41b are reset at regular intervals by the timer 44 and are counted up to thereby produce carriers CO. One of the flip-flops 42a and 42b, which are reset by the timer 44 in the same manner as the counters 41a and 41b, is set, and the resulting output is transferred to the flip-flop 43a and/or 43b for holding a direction in accordance with the subsequent pulse output from the timer 44. As a result, the LED 27a or 27b is turned on and outputs A and/or B are output.

The counters 41a and 41b may be hexadecimal counters. In this case, when the phase of the signal A is ahead of that of the signal B, setting the number of Qa pulses of the D flip-flop 24a for the clock cycle of the timer 44 to 16 or more and the number of Qb pulses of the D flip-flop 24b to less than 16 allows the direction to be determined.

In the above description, the Qa and Qb pulses are time-averaged by the illustrated simple digital circuit. Further, in order to determine the direction of a moving object S having a wider range of speeds, the pulse densities of the Qa and Qb pulses may be compared, for example, by increasing the counter values of the counters 41a and 41b and loading the values into the CPU. Such a technique is also effective.

The exemplary second processing circuit, therefore, can be configured with only a digital circuit that includes the two counters 41a and 41b for counting pulses of binary signals from the phase determination circuit 24. This makes it possible to facilitate integration into one chip using a programmable logic device (PLD) or the like.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A movement-direction determination apparatus, comprising:
   a coherent light source for irradiating a light beam containing linearly-polarized light onto a moving object having a light scattering surface;
   converging means, located between the coherent light source and the light scattering surface, for converging the irradiated coherent light beam;
   a λ/4 wave plate located between the coherent light source and the light scattering surface;
   a light splitter for splitting scattered light reflected from the light scattering surface into a plurality of beams; and a spatial filter detector for detecting the split beams with respective predetermined phase differences, wherein the beam from the coherent light source is irradiated onto the light scattering surface through the converging means and the λ/4 wave plate, and the scattered light reflected from the light scattering surface is introduced to the spatial filter detector through the beam splitter.

2. The movement-direction determination apparatus according to claim 1, wherein the spatial filter detector comprises at least one spatial filter having a pitch approximately twice the average diameter of speckle patterns produced on the spatial filter detector.

3. The movement-direction determination apparatus according to claim 1, wherein the light-splitter comprises a grating.

4. The movement-direction determination apparatus according to claim 1, wherein the spatial filter detector comprises two light-receiving elements for receiving the respective beams and two slit gratings for cyclically shielding light, wherein the slit gratings are arranged at a stage prior to the corresponding light-receiving elements and the phases of the slit gratings are shifted from each other by ¼ pitch.

5. The movement-direction determination apparatus according to claim 1, wherein the spatial filter detector comprises at least one comb-tooth sensor having comb teeth and the phases of the comb teeth are shifted from each other by ¼ pitch.

6. The movement-direction determination apparatus according to claim 1, wherein the spatial filter detector comprises bisected optical sensors for receiving the respective beams and a slit grating, which is arranged at a stage prior to the bisected optical sensors so as to cover the bisected optical sensors.

7. The movement-direction determination apparatus according to claim 1, further comprising filters for eliminating low-frequency components of the frequency signals; comparators for binarizing signals output from the filters; a phase determination circuit for determining an advance or delay of the phases of binary signals output from the comparators and for generating pulses; and an averaging circuit for time-averaging the pulses output from the phase determination circuit, wherein the movement direction of the moving object is determined in accordance with an output from the averaging circuit.

8. The movement-direction determination apparatus according to claim 7, wherein the averaging circuit is an integration circuit that comprises resistors, capacitors, and diodes, and the movement direction is determined when the output from the integration circuit exceeds a predetermined level.

9. The movement-direction determination apparatus according to claim 7, wherein the averaging circuit comprises counters for counting pulses output from the phase determination circuit and the movement direction is determined in accordance with a counter value in a predetermined period of time.

10. A movement-direction determination apparatus according to claim 1, further comprising a polarization beam splitter for transmitting the beam from the coherent light source and for reflecting the light reflected from the light scattering surface.

* * * * *